Oct. 17, 1967  M. J. CARLSON ET AL  3,347,577
PIVOT CONSTRUCTION
Filed Dec. 24, 1964
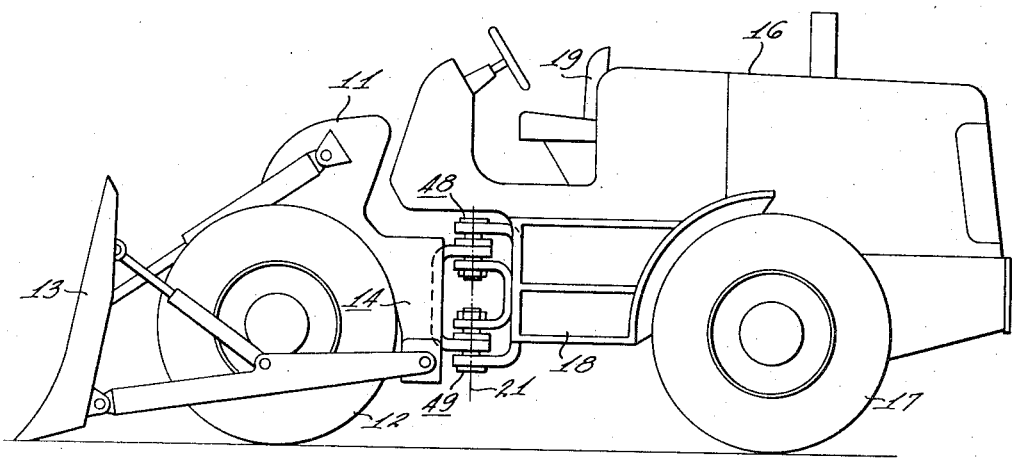
Fig. 1
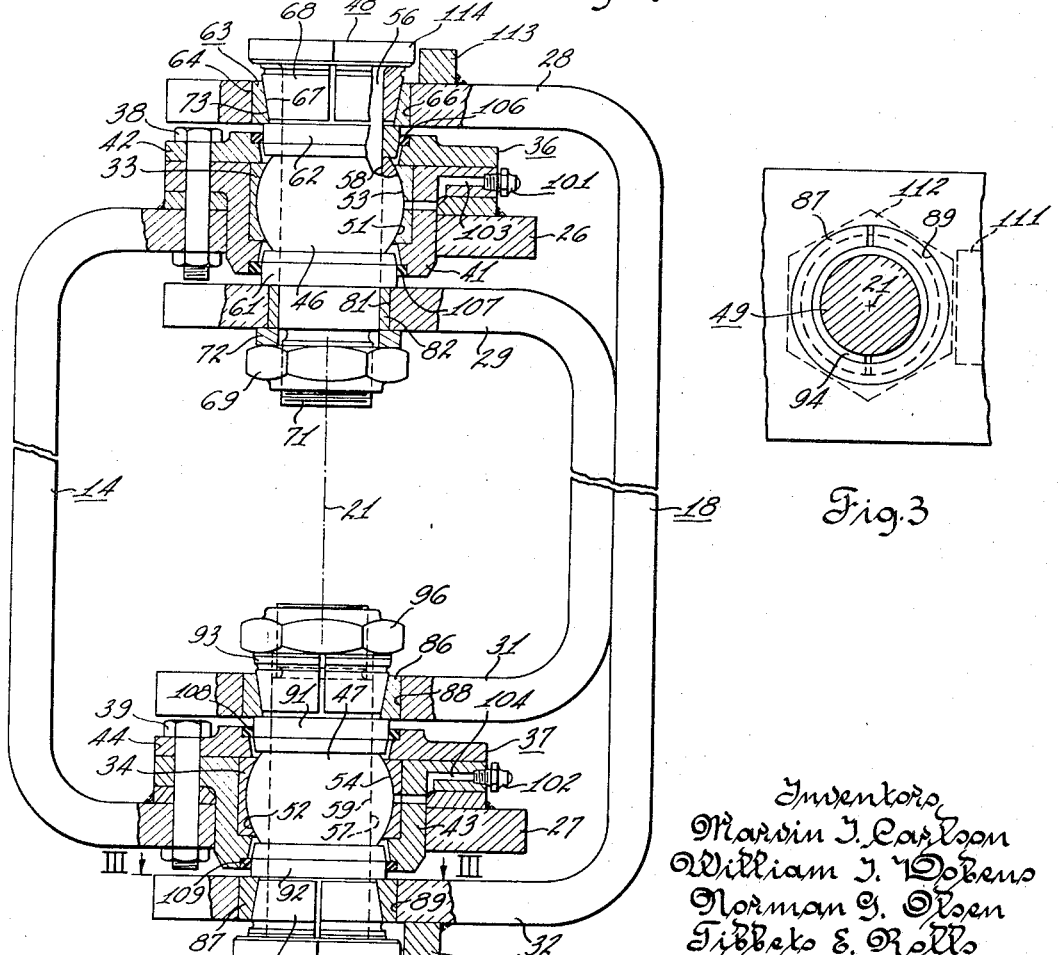
Fig. 2
Fig. 3
Inventors
Marvin J. Carlson
William J. Wokens
Norman G. Olsen
Tibbets E. Rolls
By Charles L. Schwab
Attorney

United States Patent Office 3,347,577
Patented Oct. 17, 1967

3,347,577
PIVOT CONSTRUCTION
Marvin J. Carlson, Round Lake, William J. Dobeus, Chicago, and Norman G. Olsen, Highland Park, Ill., and Tibbets E. Rolls, Genoa City, Wis., assignors to Allis-Chalmers Manufacturing Company, Milwaukee, Wis.
Filed Dec. 24, 1964, Ser. No. 420,890
14 Claims. (Cl. 287—100)

This invention relates to an improved pivot construction and particularly to a hinge connection having axially spaced self-aligning joints.

It is an object of this invention to provide an improved vertical pivot for the front and rear frames of an articulated vehicle which employs self-aligning joints.

It is a further object of this invention to provide a pair of pin-ball type joints between a pair of relatively pivotal members wherein the opposite ends of the pin are rigidly secured to spaced walls of one of the members by radially expanding means including a tapered split collet and wherein the collet and a ball like bushing are maintained in a fixed axial relationship relative to one of the walls.

It is a further object of this invention to provide an improved mounting for the pin and associated spherical bushing elements of a pin-ball joint wherein the pin is rigidly fixed to spaced walls through split tapered collets which are maintained in axially fixed relationship to the ball like element.

It is a further object of this invention to provide an improved vertical pivot connection for an articulated vehicle which is self-aligning and which does not require shimming or other fine adjustment of the bearing components.

These and other objects of this invention will be apparent to those familiar with the art when the following description is read in conjunction with the drawings in which:

FIG. 1 is a side view of an articulated vehicle in which the present invention is incorporated;

FIG. 2 is a partial section of the vertical pivot connection of the articulated vehicle shown in FIG. 1; and FIG. 3 is a view taken along the line III—III in FIG. 2.

In FIG. 1 the present invention is shown incorporated in an articulated dozer having a front section 11 which includes a pair of front wheels 12 and a dozer attachment 13 mounted on a frame member 14 and a rear section 16 which includes a pair of wheels 17 supporting a rear frame 18 on which the operator's station 19 and an engine, not shown, are mounted. The front and rear frame members 14 and 18 are pivotally connected on a vertical axis 21 for horizontal steering movement relative to one another.

Referring to FIG. 2, the front frame member 14 includes a pair of rearwardly projecting walls or flanges 26, 27 which are disposed between forwardly extending tongues or walls 28, 29 and 31, 32, of the rear frame member 18. Spherical socket bushings 33, 34 are rigidly mounted in retainer assemblies 36, 37, respectively, which in turn are secured to the flanges 26, 27 by nut and bolt fastening means 38, 39. The retainer assembly 36 includes a bushing retainer 41 and a seal retainer 42 and similarly the retainer assembly 37 includes a bushing retainer 43 and a seal retainer 44. The spherical socket bushings 33, 34 are thus secured in axially fixed relation to one another and in alignment with one another. No provision is made for adjustment of the sockets relative to one another once they are installed on the frame member 14.

The upper and lower pin-ball joints include ball like bearing elements 46, 47 and pins 48, 49. The bearing elements 46, 47 have radially outward facing spherical bearing surfaces 51, 52 in complementary radial and axial thrust transmitting relation to radial inward facing spherical bearing surfaces 53, 54 on the bushings 33, 34, respectively. The pins 48, 49 have cylindrical shank portions 56, 57 which fit snugly but slidably in the central cylindrical bore surfaces 58, 59 of bearing elements 46, 47.

The upper pin-ball joint is constructed slightly differently from the lower pin ball joint so that the frame members 14, 18 will not shift relative to one another in the direction of the pivot axis 21. This is accomplished by providing an annular spacer 61 between one axial end of bearing element 46 and wall 29. A similar spacer 62 is provided between the other axial end of the bearing element 46 and a split tapered collet 63. The collet 63 has another cylindrical surface 64 in complementary and radial thrust transmitting engagement with a cylindrical bore surface 66 in wall 28. A conical thrust surface 67 is formed on the collet which faces radially inwardly and axially outwardly away from the bearing element 46. Camming means in the form of a split annular ring 68 is provided to cam the collet 63 into firm engagement with the bore surface 66 when the pin 48 is drawn downwardly by tightening the nut 69 on the threaded portion 71 of pin 48. The nut 69 bares against the side of wall 29 remote from spacer 61, through a washer 72. As the nut 69 is tightened the ring 68 is constricted to firmly engage the shank portion 56 of the pin 48 and the conical face 73 cams the collet 63 outwardly thereby securely fastening the upper end of the pin 48 to the wall 28. The frictional engagement between the cylindrical surfaces 66 and 64 will resist axial shifting therebetween to a considerable extent. However, the pin 48, ring 68, bearing element 46, spacers 61, 62 and nut 69 positively secure the frame members 14, 18 against relative vertical movement.

Since the spacers 61, 62 and bearing element 46 fix the axial position of the collet 63 relative to wall 29, neither the collet 63 or the wall 28 will be drawn toward wall 29 when the nut 69 is tightened on the pin 48. The end of the pin 48 presenting threaded portion 71, extends through a cylindrical bore surface 81 in wall 29 which is aligned with the bore surface 66 in wall 28 and a suitable cylindrical sleeve 82 is positioned between the shank portion 56 and bore surface 81 to provide a snug fitting, radial thrust connection between the pin 48 and wall 29.

After the upper pin-ball joint has been installed the lower pin-ball joint will be assembled to complete the articulation connection. Split collets 86, 87 similar to split collet 63 are disposed in aligned cylindrical bore surfaces 88, 89 of walls 31, 32 and annular spacers 91, 92 maintain the axial spacing of the collets 86, 87 relative to the bearing element 47. Thus as the camming means 93, 94 are drawn toward one another by tightening nut 96 on the threaded end portion of pin 49, the collets 86, 87 will not be shifted axially and hence the walls 31, 32 will not be deflected toward each other by the tightening operation. The camming means 93, 94 are split tapered rings identical to the split ring 68. The ring 94 bears axially against a hexagonal head of pin 48 and the ring 93 bears axially against the nut 96. It will be noted that the relative axial positioning of the walls, 26, 27, 28, 29, 31, 32 is not critical thus permitting liberal manufacturing tolerances which affords low manufacturing cost. Concentricity tolerances are liberal too, since self-aligning face contact bearings are used.

Lubricant fittings 101, 102 and lubricant passages 103, 104 are provided for lubricating the spherical bearing surfaces 51, 53, 52, 54. Annular fluid seals 106, 107, 108, 109 are provided between the retainer assemblies 36, 37 and the spacers to keep foreign matter from lubricant in the pivot joints. As shown in FIGS. 2 and 3, a locking block 111 is welded to wall 32 to keep the head 112 of pin 49 from turning when nut 96 is tightened thereon. A similar locking block 113 is provided for the head 114 of pin 48.

The embodiments of the invention for which an exclusive property or privilege is claimed are defined as follows:

1. A self-aligning pivot connection between a pair of frame members comprising:
   a spherical socket bushing rigidly secured to one of said frame members and presenting a radially inward facing spherical bearing surface,
   a pair of walls on the other of said frame members having aligned cylindrical bore surfaces disposed on opposite sides of said socket bushing,
   a bearing element having a central cylindrical bore surface and a radially outward facing spherical bearing surface complementary to and in thrust transmitting engagement with said spherical bearing surface on said bushing,
   a pin having a cylindrical shank portion in axially slidable and close fitting radial thrust transmitting engagement with said bore surface of said bearing element, and
   end portions extending into the bores defined by said cylindrical bore surfaces in said walls, respectively,
   a split and radially expansible collet having
   a cylindrical outer face complementary to and in radial thrust transmitting engagement with one of said cylindrical bore surfaces on one said wall, and
   a conical thrust surface facing radially inwardly and axially outwardly away from said bearing element,
   axial thrust transmitting means placing said collet and bearing element in axial thrust transmitting relation to one another and to the other of said walls independently of said socket bushing and said one frame member, thereby preventing said collet from moving axially toward said bearing element and said other wall,
   camming means on one end of said pin with a conical face complementary to and in axial and radial thrust transmitting relation to said conical surface, and
   means for adjusting said camming means axially relative to said collet.

2. The structure set forth in claim 1 wherein said camming means includes a split ring presenting said conical face.

3. The structure set forth in claim 1 wherein said axial thrust transmitting means includes a pair of annular spacers one of which is interposed axially between said bearing element and said collet and the other of which is interposed axially between said bearing element and said other wall.

4. The structure set forth in claim 3 wherein said camming means includes a split ring presenting said conical face.

5. The structure set forth in claim 3 and further comprising a pair of seals between said one frame member and said spacers, respectively.

6. A self-aligning pivot connection between a pair of frame members comprising:
   a spherical socket bushing rigidly secured to one of said frame members and presenting a radially inward facing spherical bearing surface,
   a pair of walls on the other of said frame members having aligned cylindrical bore surfaces disposed on opposite sides of said socket bushing,
   a bearing element having a central cylindrical bore surface and a radially outward facing spherical bearing surface complementary to and in thrust transmitting engagement with said spherical bearing surface on said bushing,
   a pin having a cylindrical shank portion in axially slidable and close fitting radial thrust transmitting engagement with said bore surface of said bearing element, and
   end portions in adjacent relation to said cylindrical bore surfaces on said walls, respectively,
   first and second split and radially expansible collets having
   cylindrical outer faces complementary to and in radial thrust transmitting engagement with said cylindrical bore surfaces on said walls, respectively, and
   conical thrust surfaces facing radially inwardly and axially outwardly away from said bearing element,
   axial thrust transmitting means placing said collets and bearing element in axial thrust transmitting relation to one another independently of said socket bushing and said one frame member,
   camming means on opposite ends of said pin with conical faces complementary to and in axial and radial thrust transmitting relation to said conical surfaces, respectively,
   means for adjusting one of said camming means axially relative to the other, and
   means independent of said collets for preventing relative axial movement between said frame members.

7. The structure set forth in claim 6 wherein said camming means includes a pair of split rings presenting said conical faces.

8. The structure set forth in claim 7 wherein said axial thrust transmitting means includes a pair of annular spacers axially between said bearing element and said collets.

9. The structure set forth in claim 8 and further comprising a fluid seal between each of said spacers and said one frame.

10. A self-aligning pivot connection between a pair of frame members, comprising:
    a pair of socket bushings on one of said frame members aligned on an axis in vertically spaced relation to one another and each presenting a radially inwardly facing spherical bearing surface,
    a first pair of walls on the other of said frame members with first and second axially spaced cylindrical bore surfaces, respectively, aligned on said axis and disposed on axially opposite sides of one of said spherical socket bushings,
    a second pair of walls on said other frame member with third and fourth axially spaced cylindrical bore surfaces, respectively, aligned on said axis and disposed on axially opposite sides of the other of said spherical socket bushings,
    a pair of spaced bearing elements having
       central cylindrical bore surfaces aligned on said axis and
    radially outwardly facing spherical bearing surfaces complementary to and in thrust transmitting engagement with said spherical bearing surfaces on said bushings, respectively,
    a pair of axially spaced and substantially coaxial pins having cylindrical shank portions in axially slidable and radial thrust transmitting engagement with said bore surfaces of said bearing elements, respectively, one of said pins extending through the openings defined by said first and second bore surfaces and the other of said pins extending through the openings defined by said third and fourth bore surfaces,
    means establishing radial thrust transmitting connections between opposite ends of one of said pins and said first and second bore surfaces, respectively, including
    a split collet having
       a cylindrical outer surface complementary to and in radial thrust transmitting engagement with said first bore surface and
       a conical thrust surface facing radially inwardly and axially outwardly away from said bearing element on said one pin, and thrust means on one end of said one pin in radial and axial thrust transmitting relation to said collet including a conical thrust face complementary to and in engagement with said conical thrust surface, abutment means preventing movement of said collet and said bearing element on said one pin relative to the wall presenting said second bore surface in the axial direction from said one end of said pin toward its other end, said abutment means being independent of said one frame member and said socket bushing associated with said bearing element on said one pin, adjustable fastening means engaging said other end of said one pin and said wall defining said second bore surface operable upon adjustment to urge said pin in said axial direction thereby radially expanding said collet into firm engagement with said first bore surface and to prevent movement of said bearing element relative to said wall defining said second bore surface in the opposite axial direction and securing means fixedly fastening the other of said pins to said second pair of walls.

11. The structure set forth in claim 10 wherein said securing means include a pair of split collets having
   cylindrical outer surfaces complementary to and in radial thrust transmitting engagement with said third and fourth bore surfaces, respectively, and
   conical thrust surfaces facing radially inwardly and in axially opposite outward directions, axial thrust transmitting means placing said pair of collets and said bearing element on said other pin in axial thrust transmitting relation to one another, camming means on opposite ends of said pin with conical faces complementary to and in surface engagement with said conical surfaces, respectively, and means for adjusting the position of one of said camming means axially relative to said pin.

12. The structure set forth in claim 11 wherein said camming means includes a pair of split rings presenting said conical faces.

13. The structure set forth in claim 12 wherein said axial thrust transmitting means includes a pair of annular spacers axially between said bearing element and said collets.

14. The structure set forth in claim 13 and further comprising fluid seals between said one frame and said spacers, respectively.

References Cited

UNITED STATES PATENTS

| | | | |
|---|---|---|---|
| 847,719 | 3/1907 | Arnold | 287—100 |
| 1,372,624 | 3/1921 | Leipert | 308—236 X |
| 1,879,860 | 8/1932 | Mayer | 308—236 X |
| 2,037,982 | 4/1936 | Hughes | 308—236 X |
| 2,043,272 | 6/1936 | Wallgren | 308—236 X |
| 2,092,985 | 9/1937 | Oknes | 308—236 |
| 2,377,035 | 5/1945 | Pixley | 308—236 |
| 2,551,695 | 5/1951 | Oddy. | |
| 2,711,352 | 6/1955 | Hasko | 308—72 |
| 2,835,397 | 5/1958 | Wagner | 180—51 X |
| 3,009,747 | 11/1961 | Pitzer | 308—71 |
| 3,033,124 | 5/1962 | Wilson | 308—3 X |
| 3,198,563 | 8/1965 | Steidl | 287—100 |
| 3,220,751 | 11/1965 | Tweedale | 280—461 |
| 3,227,237 | 1/1966 | Moreno | 180—43 |
| 3,238,648 | 3/1966 | Cobb | 37—117.5 |
| 3,240,284 | 3/1966 | Finneman | 180—79.2 |
| 3,253,671 | 5/1966 | Fielding | 180—51 |
| 3,259,442 | 7/1966 | Boghosion | 308—187.1 |

EDGAR W. GEOGHEGAN, *Primary Examiner.*

MARTIN P. SCHWADRON, *Examiner.*

L. L. JOHNSON, *Assistant Examiner.*